United States Patent
Urakawa et al.

(10) Patent No.: US 8,418,516 B2
(45) Date of Patent: Apr. 16, 2013

(54) MANUFACTURING METHOD FOR OPTICAL ELEMENT

(75) Inventors: Takashi Urakawa, Kawasaki (JP); Keiichiro Ishihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1003 days.

(21) Appl. No.: 12/467,595

(22) Filed: May 18, 2009

(65) Prior Publication Data

US 2009/0283238 A1 Nov. 19, 2009

(30) Foreign Application Priority Data

May 19, 2008 (JP) ................................. 2008-130343

(51) Int. Cl.
*B21D 31/00* (2006.01)
(52) U.S. Cl.
USPC .............................................. 72/364; 72/700
(58) Field of Classification Search .................... 72/364, 72/700; 164/80
See application file for complete search history.

(56) References Cited

U.S. PATENT DOCUMENTS

| 5,032,196 A | 7/1991 | Masumoto et al. |
| 5,191,483 A | 3/1993 | Takizawa et al. |
| 5,896,642 A * | 4/1999 | Peker et al. ..................... 72/700 |

FOREIGN PATENT DOCUMENTS

| EP | 07-122120 B | 5/1995 |
| JP | 05-034553 A | 2/1993 |
| JP | 07-122120 B | 12/1995 |

* cited by examiner

*Primary Examiner* — Teresa M Ekiert
(74) *Attorney, Agent, or Firm* — Carter, DeLuca, Farrell & Schmidt LLP

(57) ABSTRACT

To obtain a positioning reference portion with good processing accuracy, which is formed of a newly-formed surface, a blank is press-molded by an upper mold, whereby a vertex portion abuts on an inner wall portion of a lower mold. In such a way, an oxide film that covers the vertex portion is broken by an internal pressure of the blank, and a raw material without oxide is moved by viscous flow from an inside thereof as illustrated by arrows. The raw material without oxide moved by viscous flow is thrust against the inner wall portion of the lower mold, whereby a newly-formed surface is formed, and this newly-formed surface serves as a positioning reference portion of an optical element. The newly-formed surface has surface roughness of the inner wall portion of the lower mold transferred thereto, and the positioning reference portion having good roughness is formed.

4 Claims, 14 Drawing Sheets

MANUFACTURING METHOD FOR OPTICAL ELEMENT

BACKGROUND OF THE INVENTION

1. Field of the Invention

The present invention relates to a manufacturing method for an optical element that reflects, for example, a light beam thereon, to an optical element manufactured by the manufacturing method, and to an optical apparatus including the optical element.

2. Description of the Related Art

A technology of providing a positioning reference surface on an optical element and fixing the optical element to a holding member in order to accurately hold the optical element and to position a reference of an optical effective surface is disclosed in Japanese Patent Application Laid-Open No. H05-034553 and the like.

The optical element is frequently molded by injection molding of resin or the like because such injection molding using resin facilitates mass production of the optical element. However, with regard to the optical element fabricated by the injection molding, when a thickness of the optical element is reduced for the purpose of miniaturization thereof, a flow of the resin in a mold is deteriorated, and such deterioration adversely affects the optical effective surface in some cases. On the contrary, when the thickness of the optical element is ensured to some extent, such thickening inhibits the miniaturization. Further, an atmospheric temperature in an optical apparatus has gradually risen, and a shape of the optical surface is changed by deformation of the optical element owing to thermal expansion, causing a problem to deteriorate the optical performance of the optical element.

In recent years, in order to cope with the miniaturization of the optical element and to avoid the problem of the deformation due to the thermal expansion, such a technology as disclosed in Japanese Patent Publication No. H07-122120 has been researched. In this technology, amorphous metal as an amorphous material is used, and the optical element is molded thereof by press molding. The amorphous metal turns to a semi-molten state by being applied with heat up to a glass transition temperature thereof. The amorphous metal causes a viscous flow by being press-molded in this semi-molten state, and a shape of the mold can be accurately transferred thereto.

The amorphous metal has a higher Young's modulus than the resin has, and further, for the amorphous metal, it is not necessary to consider a flow of such a molding material in the mold as in the injection molding. Accordingly, the thickness of the optical element can be reduced more than in the injection molding of the resin, and the miniaturization of the optical element can be realized. Further, a linear expansion coefficient of the amorphous metal is smaller than that of the resin, and accordingly, even if the temperature in the optical apparatus rises, thermal expansion of the amorphous metal is small, and such deterioration of the optical performance owing to the thermal expansion is also small.

At the time of attaching the optical element to the optical apparatus or the like, it is necessary to provide a positioning reference on the optical element in order to position the optical element. However, a fabrication method for the positioning reference by the amorphous metal has not been disclosed yet.

FIG. 22A illustrates the case where a side surface portion 2 of a blank 1 before being press-molded is substantially parallel to an inner wall portion 4 of a mold 3, which is located in a direction in which the side surface portion 2 is pushed and extended, and a surface having high surface roughness is formed on the side surface portion 2 at a stage of fabricating the blank 1. The side surface portion 2 of the blank 1 is press-molded, whereby a surface shape thereof follows a shape of the mold as illustrated in FIG. 22B. However, an optical element having high surface roughness left thereon is formed.

As described above, when the optical element in which such a positioning reference portion is formed by a rough surface is fixed to the holding member, there arises a problem in that the optical element is undesirably inclined with respect to a design value. Further, when the side surface portion 2 of the blank 1 is polished before the blank 1 is press-molded, and the surface roughness is thereby improved, then secondary fabrication becomes required though the surface roughness of the positioning reference portion after the blank 1 is molded is improved. Accordingly, this way of improvement of the surface roughness by polishing is not desirable.

SUMMARY OF THE INVENTION

The present invention provides a manufacturing method for an optical element, which solves the above-mentioned problem, and is capable of obtaining a positioning reference portion with good processing accuracy, provides an optical element manufactured by the manufacturing method, and provides an optical apparatus including the optical element.

In order to achieve the above-mentioned object, according to the present invention, there is provided a manufacturing method for an optical element including a positioning reference portion serving as a positioning reference, the manufacturing method comprising: heating an amorphous metal member including a region with a shape nonparallel to an inner wall of a mold; and pressing the heated amorphous metal member, forming a newly-formed surface in such a manner that a material of the amorphous metal member moved by viscous flow from breaking an oxide film that covers the region with the nonparallel shape by pressing is thrust against the inner wall of the mold, and defining the newly-formed surface as the positioning reference portion.

According to the manufacturing method for an optical element according to the present invention, the positioning reference portion is formed of the newly-formed surface on which a raw material without oxide moved by viscous flow. Accordingly, the secondary fabrication is not required, a manufacturing process is simplified, and the optical element can be held with good accuracy.

Further features of the present invention become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
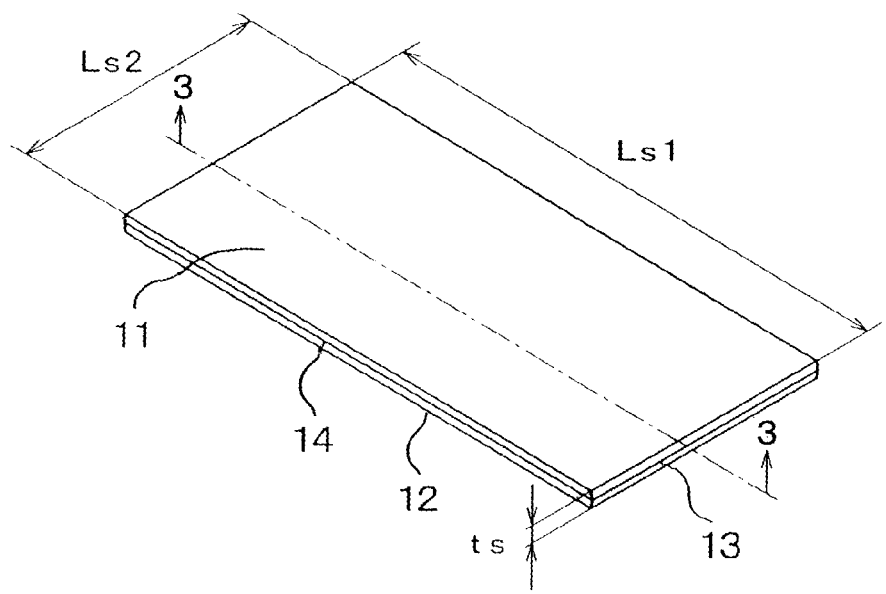
FIG. 1 is a perspective view of a blank.
Figure 2:
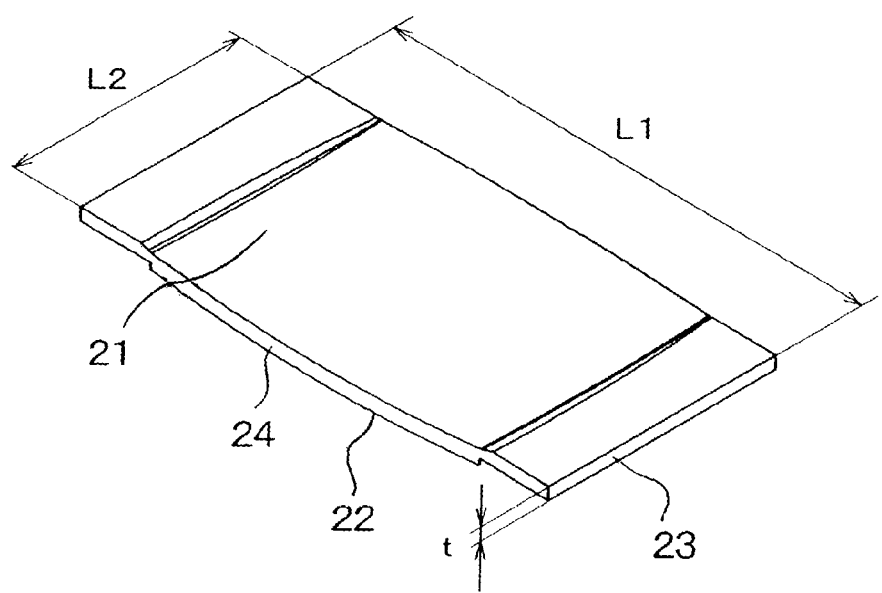
FIG. 2 is a perspective view of an optical element.

FIG. 1 illustrates a perspective view of a blank 11 made of amorphous metal before an optical element of a first embodiment is molded therewith, and FIG. 2 illustrates a perspective view of an optical element 21 formed by press-molding the blank 11.

A lower surface portion 12 of the blank 11 is a region on which an optical reflection surface 22 of the optical element 21 is formed after the blank 11 is press-molded. Further, on a side surface portion 13 of the blank 11, a positioning reference portion 23 of the optical element 21 is formed, and on a side surface portion 14, a positioning reference portion 24 of the optical element 21 is formed. Those positioning reference portions 23 and 24 are used for positioning the optical element 21 at the time of fixing the optical element 21 to a holding member (not shown).

Lengths Ls1 and Ls2 of the blank 11 illustrated in FIG. 1 are set smaller than lengths L1 and L2 corresponding to the respective ones of the optical element 21 illustrated in FIG. 2, which is after molded. A thickness ts of the blank 11 in a pressed direction thereof is set so that a volume of the blank 11 and a volume of the optical element 21 after the blank 11 is press-molded can be equal to each other. The lengths Ls1 and Ls2 of the blank 11 are set smaller than the lengths L1 and L2 of a contour of the optical element 21, and hence the thickness ts of the blank 11 is set thicker than a thickness t of the optical element 21.

In the first embodiment, the optical element 21 is formed so that the positioning reference portions 23 and 24 can be arranged on two surfaces thereof, which are the side surface portions 13 and 14. However, the number of positioning reference portions is not limited to two. The number of positioning reference portions may be one, or the positioning reference portions may be formed on the entire periphery of the optical element 21. Further, the positioning reference portions can be provided on non-optical surfaces other than the side surface portions 13 and 14. The side surface portions 13 and 14 of the blank 11 form the positioning reference portions 23 and 24 of the optical element 21 in the same course. Accordingly, a course of forming the positioning reference portion 23 from the side surface portion 13 of the blank 11 is described below.

Figure 3:
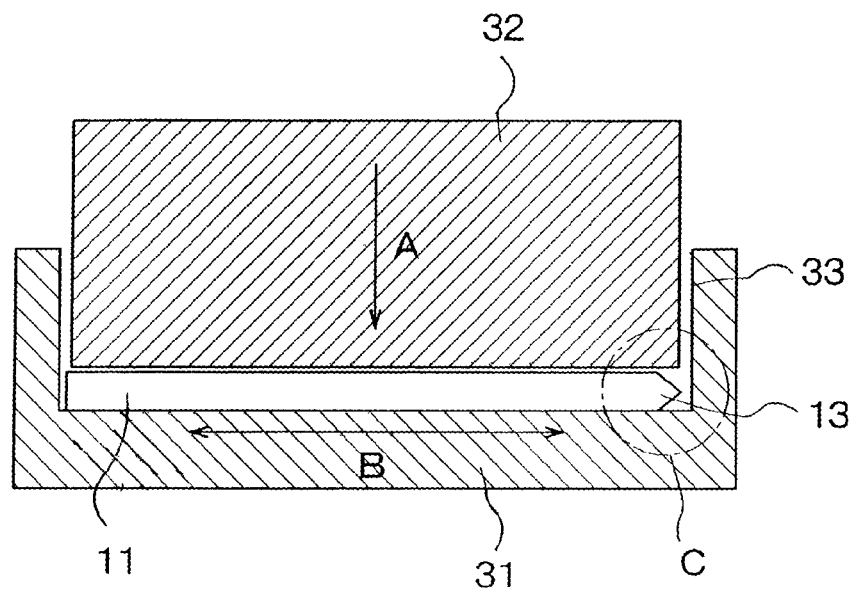
FIG. 3 is an explanatory view of a press molding step.

FIG. 3 is a cross-sectional view of a step in general press molding of molding the optical element 21 including an optical effective surface, illustrating a cross section passing through a line 3-3 of FIG. 1. After the blank 11 is inserted into an inside of a lower mold 31 of a mold, the entire mold is heated up to a temperature exceeding a glass transition temperature of the blank 11. Thereafter, the blank 11 is press-molded in a direction A by an upper mold 32, whereby the side surface portion 13 of the blank 11 moves in a direction B by a viscous flow, and abuts on an inner wall portion 33 on a side surface of the lower mold 31. In such a way, a shape of the inner wall portion 33 of the lower mold 31 is transferred to the side surface portion 13 of the blank 11, whereby the positioning reference portion 23 is formed.

Figure 4:
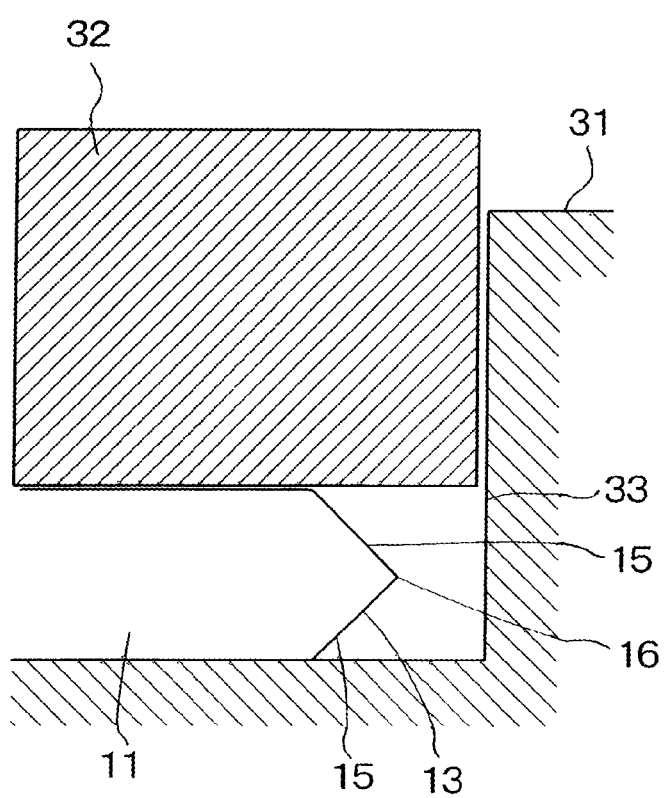
FIG. 4 is an enlarged view of a corner portion of FIG. 3.

FIG. 4 is an enlarged view of a corner portion of FIG. 3, illustrating a positional relationship between the blank 11 and the inner wall portion 33 of the lower mold 31 before the blank 11 is press-molded. Upper and lower surfaces of the side surface portion 13 are chamfered. Chamfered portions 15 intersect each other, whereby a vertex portion 16 that first contacts the inner wall portion 33 of the lower mold 31 is formed. In this embodiment, sizes of chamfers are set symmetric to each other in the up- and down direction, but the sizes of the upper and lower chamfers may differ from each other. Further, angles of the chamfers are set not to be parallel to a surface that serves as the positioning reference portion 23 formed after the blank 11 is pressed, that is, to the inner wall portion 33 of the lower mold 31.

Figure 5A:
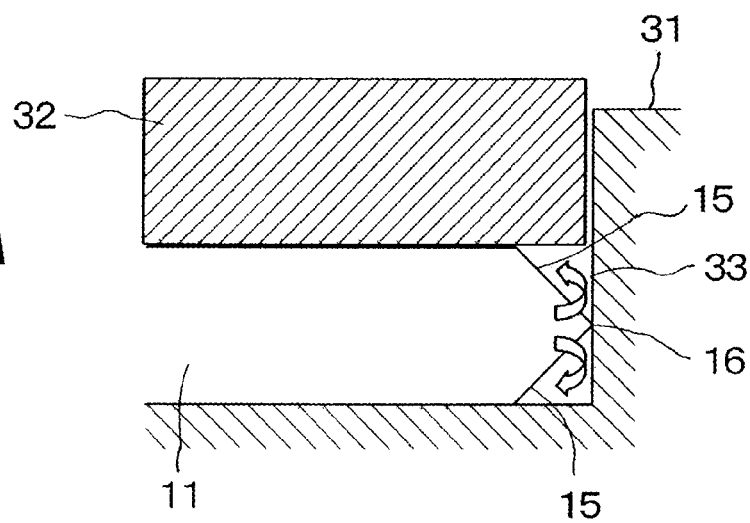
FIGS. 5A and 5B are explanatory views of the press molding step.
Figure 5B:
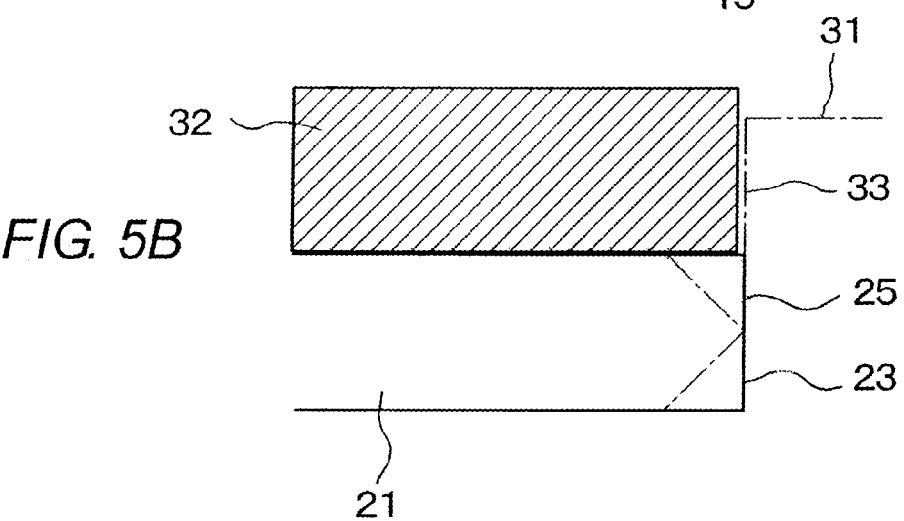

As illustrated in FIG. 5A, the blank 11 is press-molded by the upper mold 32 from such a state of FIG. 4, whereby the vertex portion 16 of the side surface portion 13 abuts on the inner wall portion 33 of the lower mold 31. In such a way, an oxide film that covers the blank 11 at the vertex portion 16 thereof is broken by an internal pressure of the blank 11, which is caused by such pressing, and a raw material without oxide is moved by viscous flow from an inside thereof as illustrated by arrows. The raw material without oxide moved by viscous flow is thrust against the inner wall portion 33 of the lower mold 31 as illustrated in FIG. 5B, whereby a newly-formed surface 25 is formed, and this newly-formed surface 25 serves as the positioning reference portion 23 of the optical element 21.

The newly-formed surface 25 is formed in such a manner that the raw material without oxide is moved by viscous flow from the side surface portion 13 thereof. Accordingly, a rough surface that has been included in the side surface portion 13 of the blank 11 does not remain on the positioning reference portion 23. Therefore, the newly-formed surface 25 has surface roughness of the inner wall portion 33 of the lower mold 31 transferred thereto, and the positioning reference portion 23 having good surface roughness is formed thereon.

Figure 6A:
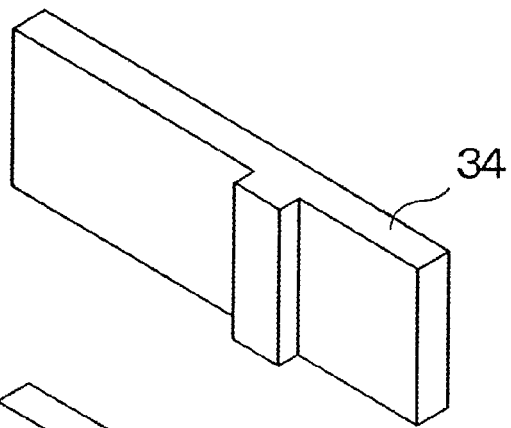
FIGS. 6A, 6B and 6C are perspective views of a holding member.
Figure 6B:
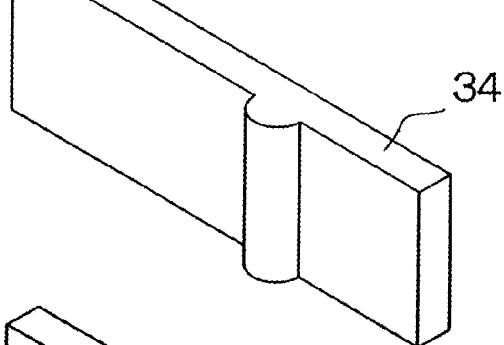
Figure 6C:
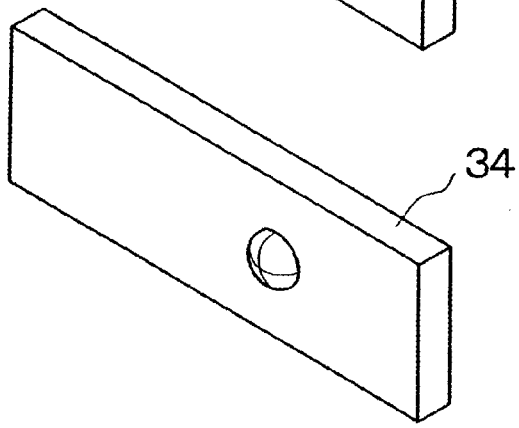

A shape of a holding member 34 on which the positioning reference portion 23 of the optical element 21 abuts is not limited to one that allows the holding member 34 to be brought into surface contact with the positioning reference portion 23 concerned as illustrated in FIG. 6A. Even if the shape of the holding member 34 is one that allows the holding member 34 to be brought into line contact with the positioning reference portion 23 as illustrated in FIG. 6B or to be brought into point contact therewith as illustrated in FIG. 6C, a position of the optical element 21 can be determined accurately.

Figure 7:
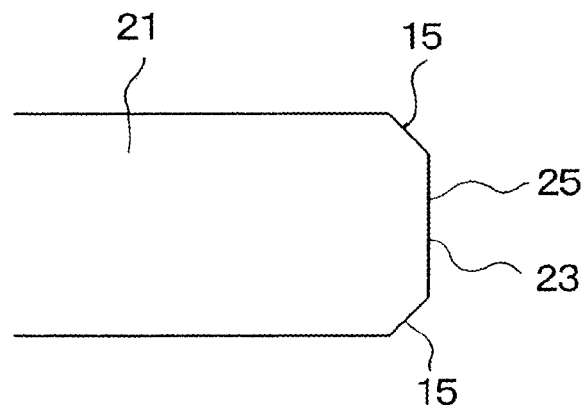
FIG. 7 is a cross-sectional view of the optical element after a blank is press-molded.

Like chamfered portions 15 on the side surface portion 13 of the optical element 21, which are illustrated in FIG. 7, the positioning reference portion 23 formed of the newly-formed surface 25 may leave the chamfered portions 15 of the side surface portion 13 of the blank 11. At this time, the chamfered portions 15 still have the rough surface that has formed the side surface portion 13 of the blank 11. However, the positioning reference portion 23 formed of the newly-formed surface 25 is formed of such a surface having good surface roughness.

Second Embodiment

Figure 8:
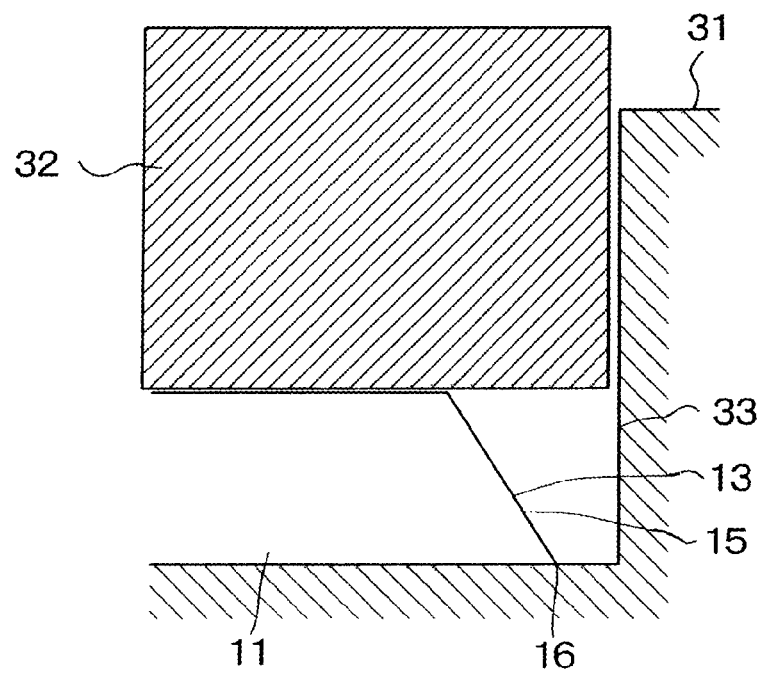
FIG. 8 is an explanatory view of a press molding step of a second embodiment.

A second embodiment illustrated in FIG. 8 is different from the first embodiment only in a shape of the side surface portion 13 of the blank 11. Also in the second embodiment, the optical element 21 is molded by the press molding in the same way as illustrated in FIG. 2. Note that the same reference numerals are denoted to the same regions as those in the first embodiment.

FIG. 8 corresponds to FIG. 4 of the first embodiment, and illustrates a positional relationship between a blank 11 before being press-molded and the inner wall portion 33 of the lower mold 31. A chamfered portion 15 is provided on the side surface portion 13, and a vertex portion 16 is formed on one side of the side surface portion 13.

In the second embodiment, the vertex portion 16 is provided on a surface side on which the optical reflection surface 22 is formed. However, the vertex portion 16 may be provided on the other surface side which is opposite to the optical reflection surface. Further, an angle of such a chamfer is set nonparallel to the surface that serves as the positioning reference portion 23 formed after the blank 11 is pressed, that is, to the inner wall portion 33 of the lower mold 31.

Figure 9A:
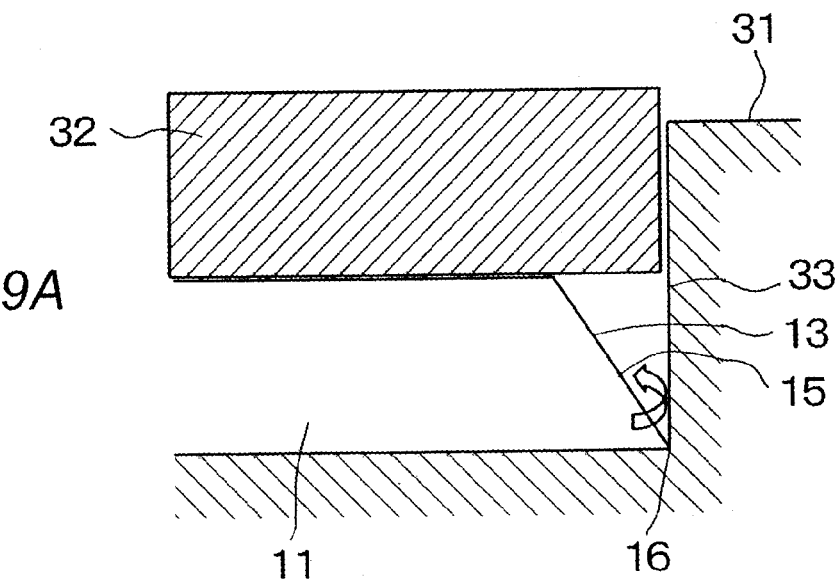
FIGS. 9A and 9B are explanatory views of the press molding step.

As illustrated in FIG. 9A, when the blank 11 is press-molded by the upper mold 32, the vertex portion 16 of the side surface portion 13 abuts on the inner wall portion 33 of the lower mold 31. At this time, an oxide film that covers the blank 11 at the vertex portion 16 thereof is broken by the internal pressure of the blank 11, which is caused by the pressing, and the raw material without oxide is moved by viscous flow from an inside thereof as illustrated by an arrow.

Figure 9B:
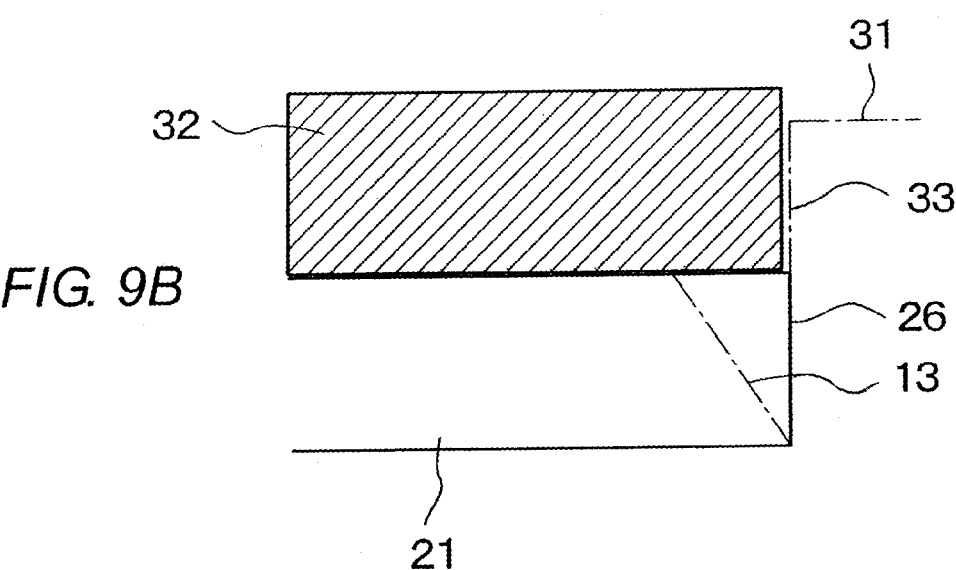

As illustrated in FIG. 9B, the raw material without oxide moved by viscous flow is thrust against the inner wall portion 33 of the lower mold 31, whereby a newly-formed surface 26 is formed as a new surface, and this newly-formed surface 26 serves as the positioning reference portion 23 of the optical element 21.

The newly-formed surface 26 is formed in such a manner that the raw material without oxide is moved by viscous flow from the vertex portion 16 thereof. Accordingly, the surface roughness of the inner wall portion 33 of the lower mold 31 is transferred to the positioning reference portion 23 formed of the newly-formed surface 26 formed on the optical element 21, and the positioning reference portion 23 is formed into a positioning reference portion having extremely good surface roughness.

Figure 10:
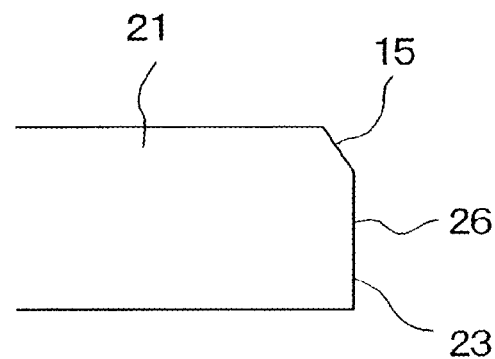
FIG. 10 is a cross-sectional view of an optical element after a blank is press-molded.

In FIG. 9B, the positioning reference portion 23 formed of the newly-formed surface 26 is formed on the entire surface of the side surface portion 13. However, as illustrated in FIG. 10, the chamfered portion 15 may be left on the side surface portion 13 of the blank 11. At this time, the chamfered portion 15 is formed of the rough surface that has formed the side surface portion 13 of the blank 11. However, the positioning reference portion 23 formed of the newly-formed surface 26 is formed of such a surface having good surface roughness.

Third Embodiment

Figure 11:
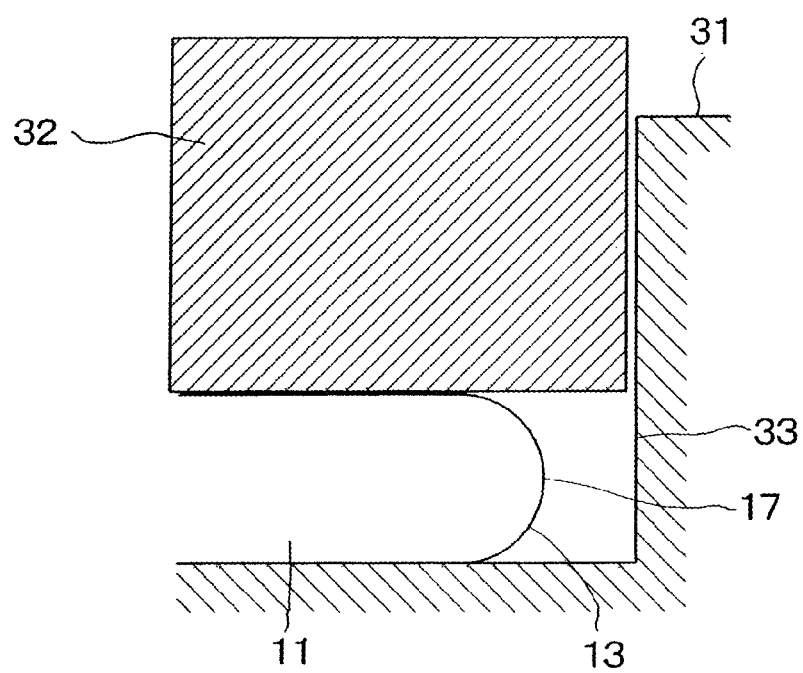
FIG. 11 is an explanatory view of a press molding step of a third embodiment.

FIG. 11 illustrates a cross-sectional view of a third embodiment, illustrating a positional relationship between the blank 11 before being press-molded and the inner wall portion 33 of the lower mold 31, in which the side surface portion 13 is formed as a circular portion 17.

Figure 12A:
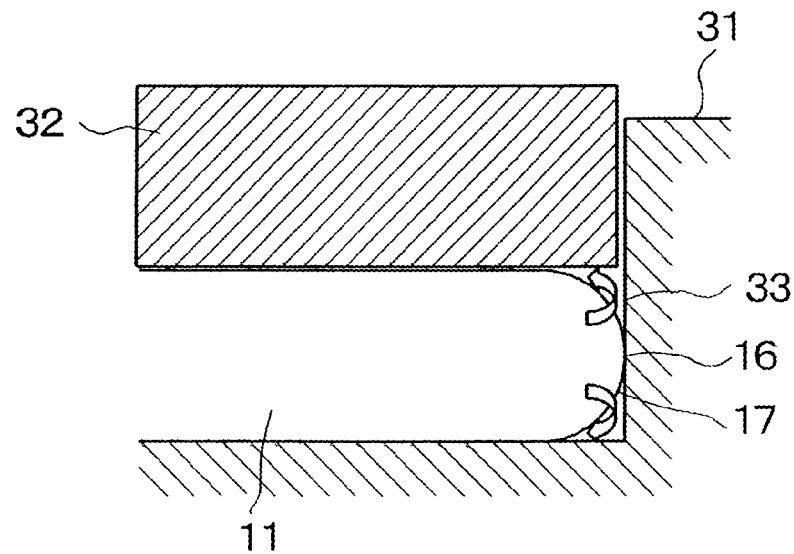
FIGS. 12A and 12B are explanatory views of the press molding step.

As illustrated in FIG. 12A, the blank 11 is press-molded by the upper mold 32, whereby an oxide film that covers the blank 11 at a vertex portion 16 thereof is broken by the internal pressure of the blank 11, which is caused by the pressing, when the vertex portion 16 of the circular portion 17 abuts on the inner wall portion 33 of the lower mold 31. In such a way, the raw material without oxide is moved by viscous flow from an inside thereof as illustrated by arrows.

Figure 12B:
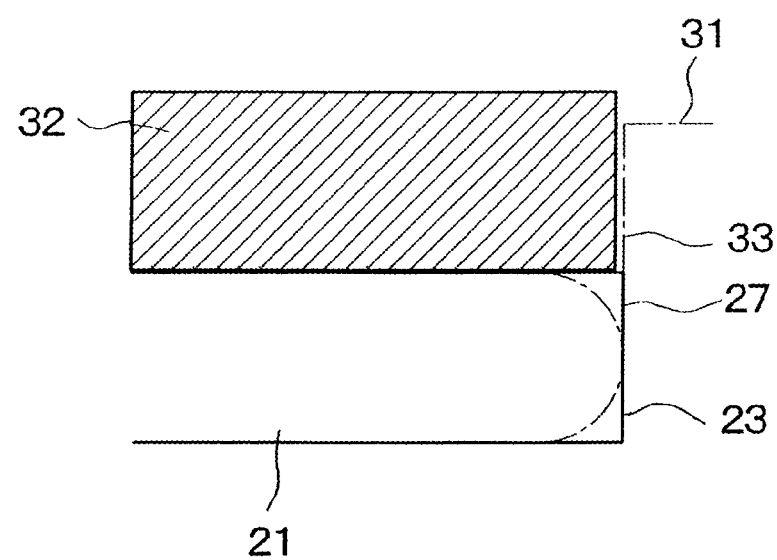

As illustrated in FIG. 12B, the raw material without oxide moved by viscous flow is thrust against the inner wall portion 33 of the lower mold 31, whereby a newly-formed surface 27 formed as a new surface is formed, and serves as the positioning reference portion 23 of the optical element 21.

Figure 13:
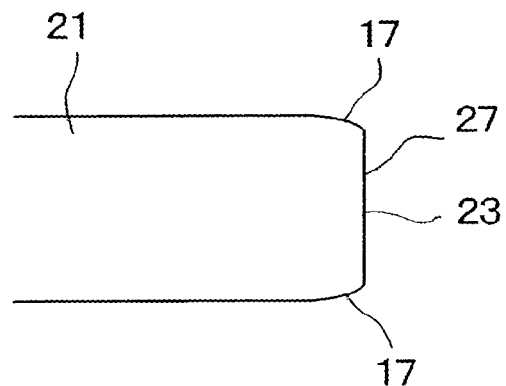
FIG. 13 is a cross-sectional view of an optical element after a blank is press-molded.

In this case, a construction is illustrated, in which the positioning reference portion 23 formed of the newly-formed surface 27 is formed on the entirety of the side surface portion 13. However, as illustrated in FIG. 13, the circular portion 17 of the side surface portion 13 of the blank 11 may be left on a part of the optical element 21. At this time, the circular portion 17 is formed of the rough surface that has formed the side surface portion 13 of the blank 11. However, the positioning reference portion 23 formed of the newly-formed surface 27 is formed of such a surface having good surface roughness.

Fourth Embodiment

Figure 14:
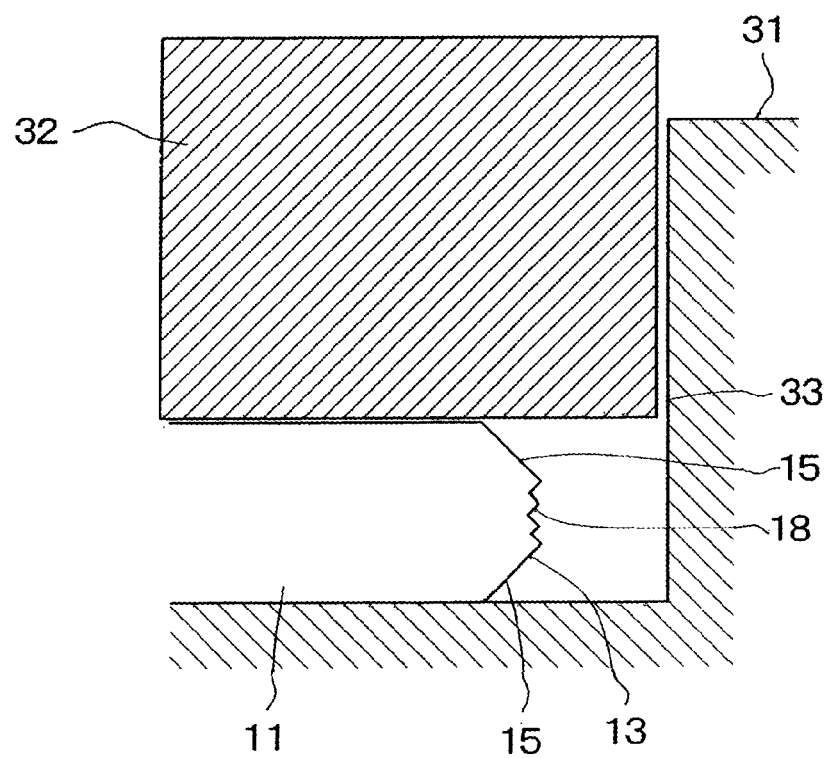
FIG. 14 is an explanatory view of a press molding step of a fourth embodiment.

FIG. 14 illustrates a cross-sectional view of a fourth embodiment, illustrating a positional relationship between the blank 11 before being press-molded and the inner wall portion 33 of the lower mold 31, in which the side surface portion 13 is formed of the chamfered portions 15 and a rough surface portion 18. In order to facilitate the understanding of the fourth embodiment, surface roughness of the rough surface portion 18 is illustrated while laying emphasis thereon.

Figure 15A:
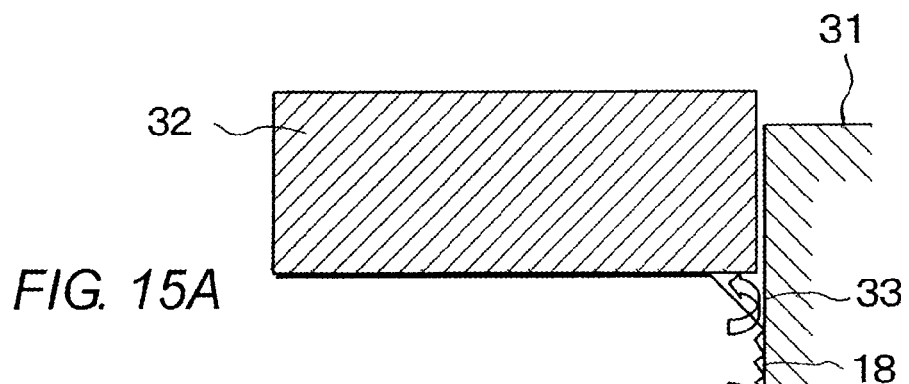
FIGS. 15A and 15B are explanatory views of the press molding step.

As illustrated in FIG. 15A, when the blank 11 is press-molded by the upper mold 32, the rough surface portion 18 of the side surface portion 13 abuts on the inner wall portion 33 of the lower mold 31. At this time, an oxide film that covers the blank 11 on boundary portions between the rough surface portion 18 and the chamfered portions 15 is broken by the internal pressure of the blank 11, which is caused by the pressing, and as illustrated by arrows, the raw material without oxide is moved by viscous flow from an inside thereof.

Figure 15B:
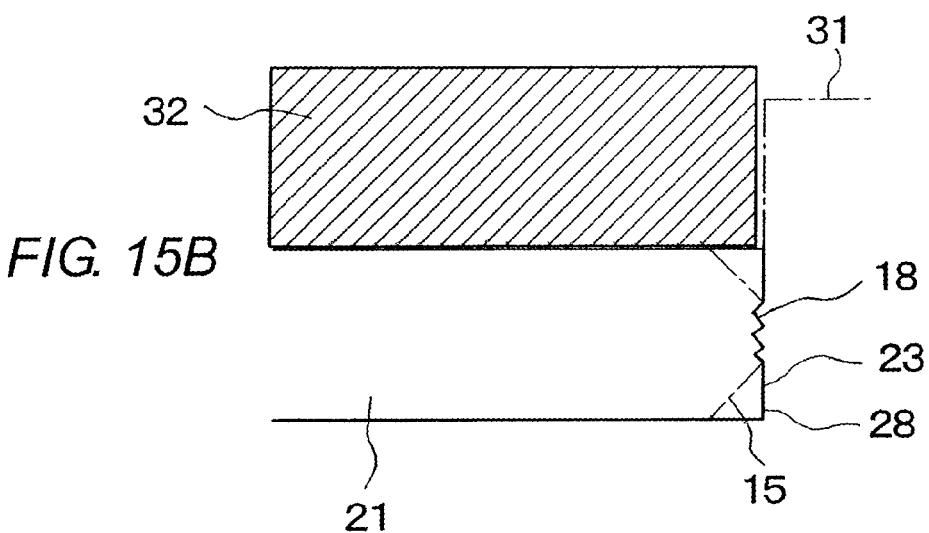

As illustrated in FIG. 15B, the raw material without oxide moved by viscous flow is thrust against the inner wall portion 33 of the lower mold 31, whereby a newly-formed surface 28 is formed, and this newly-formed surface 28 serves as the positioning reference portion 23 of the optical element 21. The newly-formed surface 28 is formed by thrusting the rough surface portion 18 and the chamfered portions 15 of the side surface portion 13 of the blank 11 against the inner wall portion 33 of the lower mold 31 by the viscous flowing thereof. Accordingly, the positioning reference portion 23 formed on the optical element 21 is formed of two types of portions, which are the rough surface portion 18 that has been included in the side surface portion 13 of the blank 11, and the newly-formed surface 28.

The newly-formed surface 28 has the surface roughness of the inner wall portion 33 of the lower mold 31 transferred thereto, and the positioning reference portion 23 having good surface roughness is formed thereon. Accordingly, at the time of positioning the optical element 21, a reference portion of the holding member 34 is made to abut on the newly-formed surface 28 of the optical element 21. The holding member 34 is positioned by using the newly-formed surface 28, and hence it is desirable that the newly-formed surface 28 have a wider area than the rough surface portion 18 has.

Figure 16:
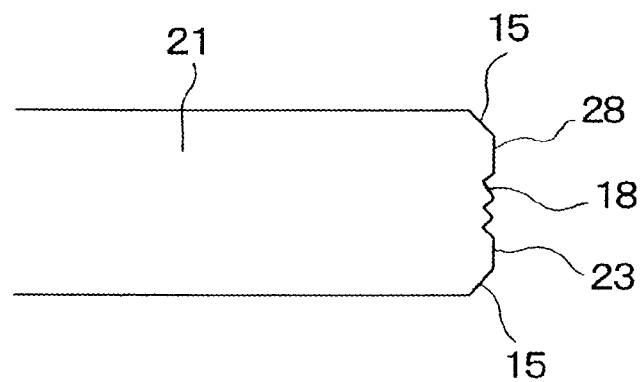
FIG. 16 is a cross-sectional view of an optical element after a blank is press-molded.

In FIGS. 15A and 15B, a construction is illustrated, in which the positioning reference portion 23 formed of the newly-formed surface 28 is formed on the entirety of the side surface portion other than the rough surface portion 18. However, as illustrated in FIG. 16, the chamfered portions 15 of the blank 11 may be left on the positioning reference portion 23 of the optical element 21. At this time, the chamfered portions 15 are formed of the rough surface that has formed the side surface portion 13 of the blank 11. However, the positioning reference portion 23 formed of the newly-formed surface 28 is formed of such a surface having good surface roughness.

Fifth Embodiment

Figure 17:
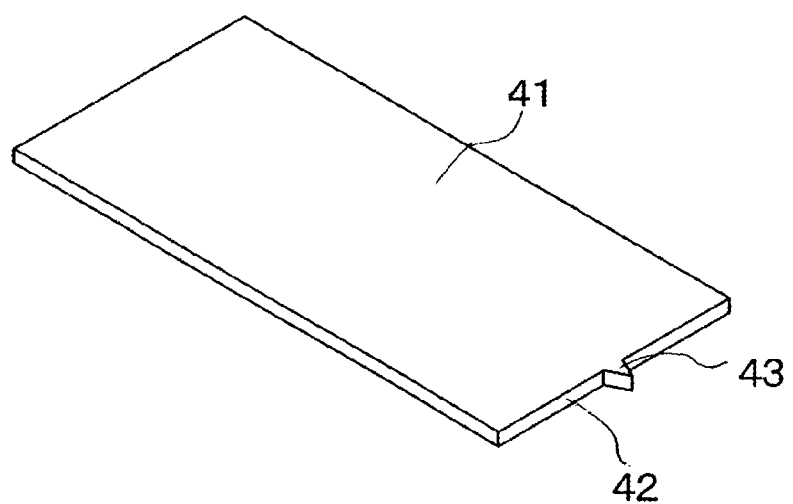
FIG. 17 is a perspective view of a blank of a fifth embodiment.

FIG. 17 illustrates a shape of a blank 41 of a fifth embodiment, in which a protruding portion 43 that serves as the positioning reference portion 23 after the blank 41 is press-molded is provided on a side surface portion 42. The protruding portion 43 is chamfered so as to form a vertex portion. However, the protruding portion 43 may be formed into a circular shape as illustrated in the above-mentioned embodiment, or into such a shape that does not have the vertex portion. A ridge direction on the vertex portion of the protruding portion 43 is a thickness direction of the blank 41, but is not limited to this thickness direction. The number of protruding portion 43 is not limited to one, either, and a plurality of the protruding portions 43 may be provided.

Figure 18:
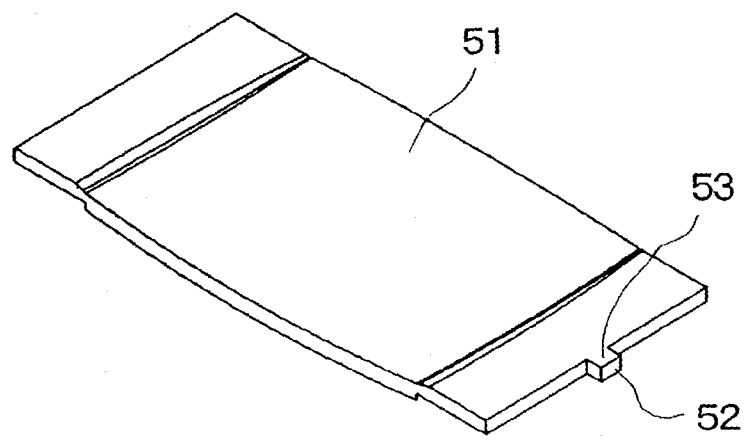
FIG. 18 is a perspective view of an optical element.

The blank 41 is press-molded, whereby an optical element 51 illustrated in FIG. 18 is formed. On this optical element 51, a positioning reference portion 53 formed of a newly-formed surface 52 is formed.

Figure 19A:
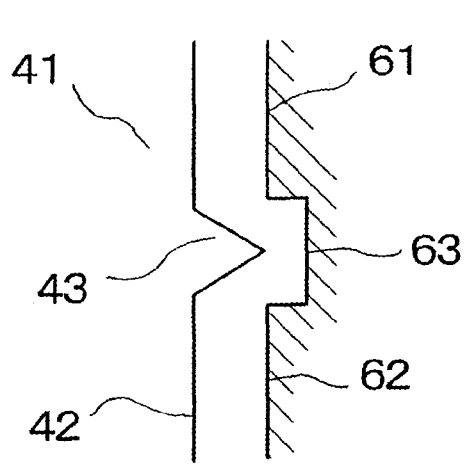
FIGS. 19A and 19B are explanatory views of a press molding step.

FIG. 19A illustrates a positional relationship between the blank 41 before being press-molded and an inner wall portion 62 of a lower mold 61 when viewed from a pressed direction of the blank 41. The protruding portion 43 is provided on the blank 41, and a recessed portion 63 for creating the positioning reference portion 53 is formed on the inner wall portion 62 of the lower mold 61.

Figure 19B:
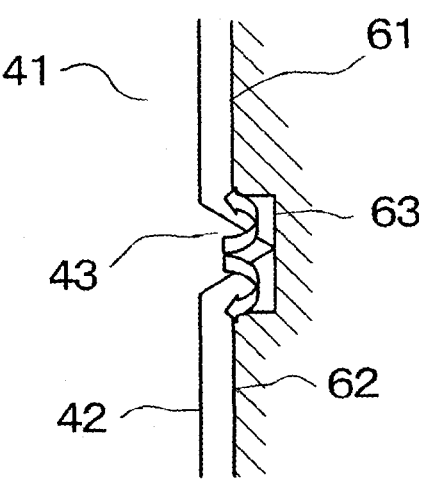

The blank 41 is press-molded as illustrated in FIG. 19B, whereby an oxide film that covers the blank 41 at contact spots thereof is broken by the internal pressure of the blank 41, which is caused by the pressing, when the protruding portion 43 abuts on the recessed portion 63. Then, as illustrated by arrows, a raw material without oxide is moved by viscous flow from an inside thereof. If the side surface portion 42 contacts the inner wall portion 62 of the lower mold 61 before the protruding portion 43 contacts the recessed portion 63 of the lower mold 31, the raw material without oxide are not allowed to be moved from the protruding portion 43, and the newly-formed surface 52 is not to be formed. Accordingly, the protruding portion 43 and the recessed portion 63 are formed at a height and a depth, at which both thereof are brought into contact with each other before the side surface portion 42 of the blank 41 and the inner wall portion 62 of the lower mold 61 contact each other, whereby the positioning reference portion 53 of the optical element 51 is prepared to be formed.

Figure 20:
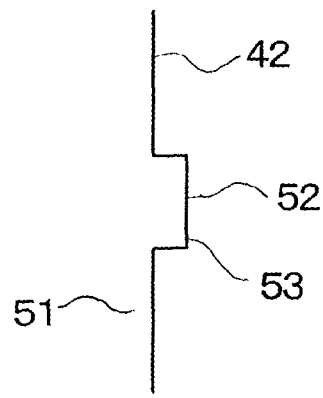
FIG. 20 is a cross-sectional view of the optical element after a blank is press-molded.

As illustrated in FIG. 20, the raw material without oxide moved by viscous flow is thrust against the inner wall portion 62 of the lower mold 61, whereby the newly-formed surface 52 is formed, and the newly-formed surface 52 forms the positioning reference portion 53 of the optical element 51. In the fifth embodiment, only the positioning reference portion 53 of the optical element 51 is formed of the newly-formed surface 52, and accordingly, the side surface portion 42 of the optical element 51, which is other than the positioning reference portion 53, is formed of a rough surface.

Figure 21A:
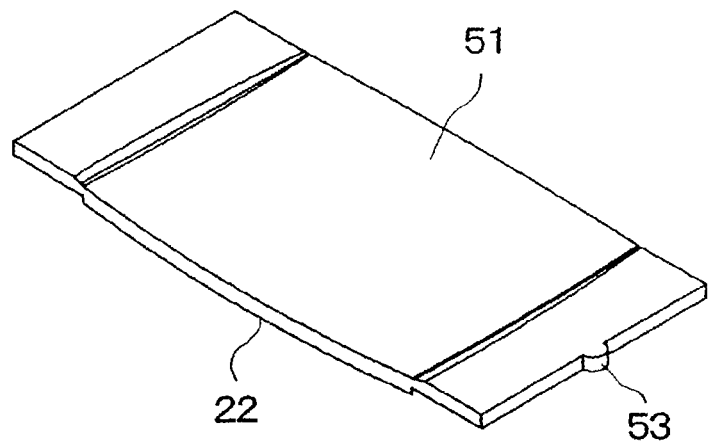
FIGS. 21A and 21B are perspective views of the optical element.
Figure 21B:
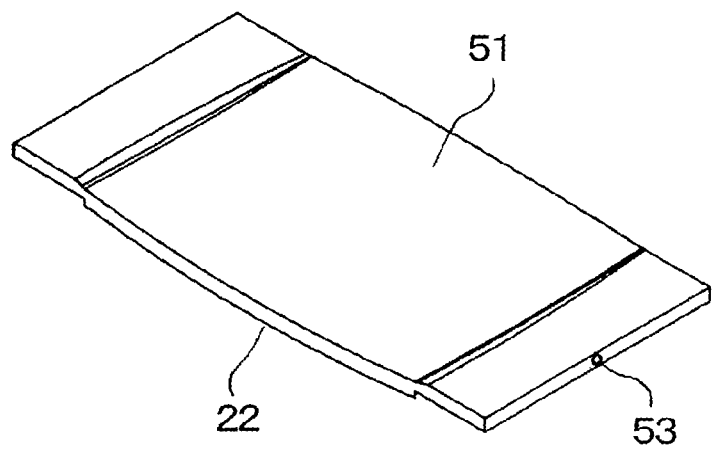
Figure 22A:
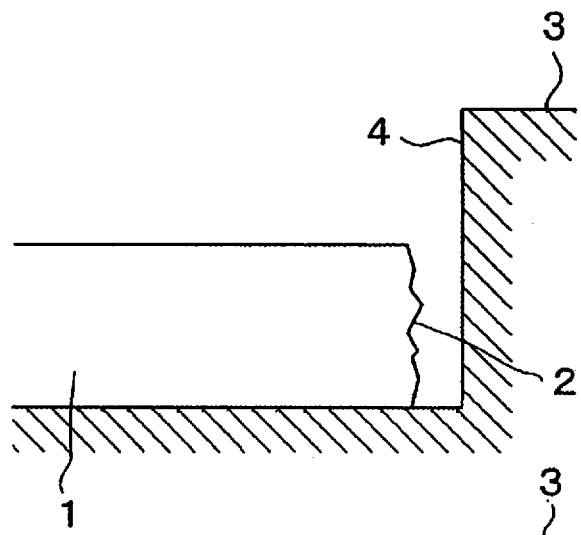
FIGS. 22A and 22B are explanatory views of a conventional example.
Figure 22B:
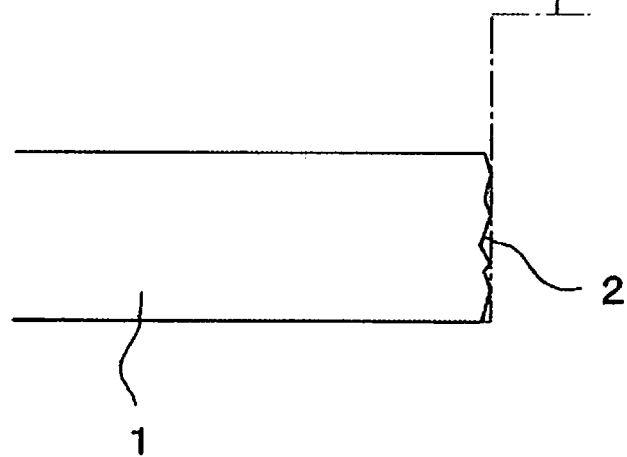

The positioning reference portion 53 formed of the newly-formed surface 52 of the fifth embodiment is formed as planes, but may be a circular one as illustrated in FIG. 21A. Further, as illustrated in FIG. 21B, the newly-formed surface 52 may be formed like a hemispherical positioning reference portion 53.

In each of those shapes, the protruding portion 43 is formed on the blank 41, whereby the positioning reference portion 53 formed of the newly-formed surface 52 can be partially formed on the side surface portion 42 of the optical element 51.

In the fifth embodiment, the example of using the positioning reference portion 53 for holding the optical element 51 has been shown. However, the positioning reference portion 53 may be used not only for holding the optical element 51 but also for positioning a plurality of the optical elements 51 with respect to other optical parts. Further, also with regard to a mold structure, such a construction of moving the upper mold has been described in the fifth embodiment, but such a movable portion may be the lower mold 61.

The present invention is applicable not only to the optical element created by the method according to any one of the first to fifth embodiments described above, but also to an optical apparatus (image pickup apparatus, image projection apparatus) including the optical element concerned.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-130343, filed May 19, 2008, which is hereby incorporated by reference herein in its entirety.

What is claimed is:

1. A method of manufacturing an optical element including a positioning reference portion serving as a positioning reference, the manufacturing method comprising:
   providing a mold having an inner wall;
   providing an amorphous metal member including an inner material and an oxide film disposed on the inner material, the amorphous metal member including a region configured to face the inner wall of the mold and having a shape nonparallel to the inner wall of the mold, the region configured to form a positioning reference portion;
   heating the amorphous metal member; and
   pressing the heated amorphous metal member in such a manner that the oxide film is broken at the region by internal pressure, and the inner material is moved by viscous flow through the broken oxide film and thrust against the inner wall of the mold to form a newly-formed surface that defines the positioning reference portion.

2. A method of manufacturing an optical element according to claim 1, wherein, before pressing, a corner portion of a surface of the region is chamfered, the surface facing the inner wall of the mold.

3. A method of manufacturing an optical element according to claim 1, wherein, before pressing, the region includes a portion having a circular shape in a surface which faces the inner wall of the mold.

4. A method of manufacturing an optical element according to claim 1, wherein, before pressing, the region includes a protrusion on a part of a surface which faces the inner wall of the mold.

\* \* \* \* \*